United States Patent
Buckley, III

(10) Patent No.: US 6,565,102 B2
(45) Date of Patent: May 20, 2003

(54) FOLDING STORAGE ASSEMBLY

(76) Inventor: Michael E. Buckley, III, 1111 Brassie Ct., Annapolis, MD (US) 21012

( * ) Notice: Subject to any disclaimer, the term of this patent is extended or adjusted under 35 U.S.C. 154(b) by 0 days.

(21) Appl. No.: 09/983,115

(22) Filed: Oct. 23, 2001

(65) Prior Publication Data

US 2003/0075888 A1 Apr. 24, 2003

(51) Int. Cl.⁷ .................................................. B62B 3/02
(52) U.S. Cl. ............................. 280/33.992; 280/33.996; 280/DIG. 4
(58) Field of Search ................... 280/33.992, 33.993, 280/651, 47.18, 47.19, 47.26, 47.28, 47.34, 47.35, 87.01, 33.996, 33.997, DIG. 3, DIG. 4; 220/6, 7, 485

(56) References Cited

U.S. PATENT DOCUMENTS

| | | | | |
|---|---|---|---|---|
| 2,558,372 A | * | 6/1951 | Nidermayer, Jr. | 224/409 |
| 2,662,661 A | | 12/1953 | Goldman | |
| 2,689,133 A | | 9/1954 | Goldman | |
| 2,997,311 A | * | 8/1961 | Umanoff | 280/33.993 |
| 3,361,438 A | | 1/1968 | Davis | |
| 3,375,018 A | * | 3/1968 | Close | 280/33.991 |
| 3,497,234 A | * | 2/1970 | Schray | 280/33.993 |
| 3,534,973 A | | 10/1970 | Elliott | |
| 3,993,319 A | * | 11/1976 | Day | 108/14 |
| 4,235,331 A | | 11/1980 | Bates, III et al. | |
| 4,361,340 A | * | 11/1982 | Soriano | 280/33.992 |
| 4,376,502 A | | 3/1983 | Cohen | |
| 4,526,285 A | * | 7/1985 | Cerveny et al. | 220/485 |
| 4,537,413 A | | 8/1985 | Rehrig | |
| 4,560,180 A | * | 12/1985 | Ulmer | 280/33.993 |
| 4,630,746 A | * | 12/1986 | Fortenberry | 220/1.5 |
| 4,871,100 A | * | 10/1989 | Posner | 224/411 |
| 5,002,292 A | | 3/1991 | Myers | |
| 5,125,674 A | * | 6/1992 | Manuszak | 280/30 |
| 5,265,893 A | | 11/1993 | Ettlin | |
| 5,299,704 A | * | 4/1994 | Thorby | 220/6 |
| D363,589 S | * | 10/1995 | Lafleur et al. | 280/33.993 |
| 5,458,255 A | * | 10/1995 | Addeo et al. | 220/6 |
| 5,494,308 A | | 2/1996 | Southerland | |
| 5,542,687 A | * | 8/1996 | Harris | 280/33.993 |
| 5,794,952 A | | 8/1998 | Kern et al. | |
| D400,679 S | | 11/1998 | Kern et al. | |
| 5,836,596 A | * | 11/1998 | Wanzl | 280/33.991 |
| 5,918,798 A | * | 7/1999 | Frahm | 229/117.07 |
| 5,918,891 A | * | 7/1999 | Russell | 280/33.991 |
| 5,947,313 A | | 9/1999 | Kern et al. | |
| 6,098,998 A | * | 8/2000 | Ondrasik | 280/33.993 |

* cited by examiner

Primary Examiner—Brian L. Johnson
Assistant Examiner—Bridget Avery
(74) Attorney, Agent, or Firm—Diederiks & Whitelaw PLC

(57) ABSTRACT

A folding storage assembly includes a first panel having first and second end portions, a second panel having first and second end portions, and a third panel having first and second end portions. The first panel is pivotally connected to the second panel. In addition, the third panel is pivotally connected to the first panel. The folding storage assembly is movable between an in-use position and a stowed position. In the in-use position, the first panel extends laterally from the second end portion of the third panel and the second panel projects upward from the second end portion of the first panel. In the stowed position, the first and second panels are positioned substantially flush with the third panel. Moreover, the storage assembly may include at least one fastening member for fastening the assembly to the front wall of a basket. Therefore, the invention provides a folding storage assembly that can easily be fastened to a cart basket and can be secured in an open or stowed position to accommodate the needs of a shopper.

24 Claims, 4 Drawing Sheets

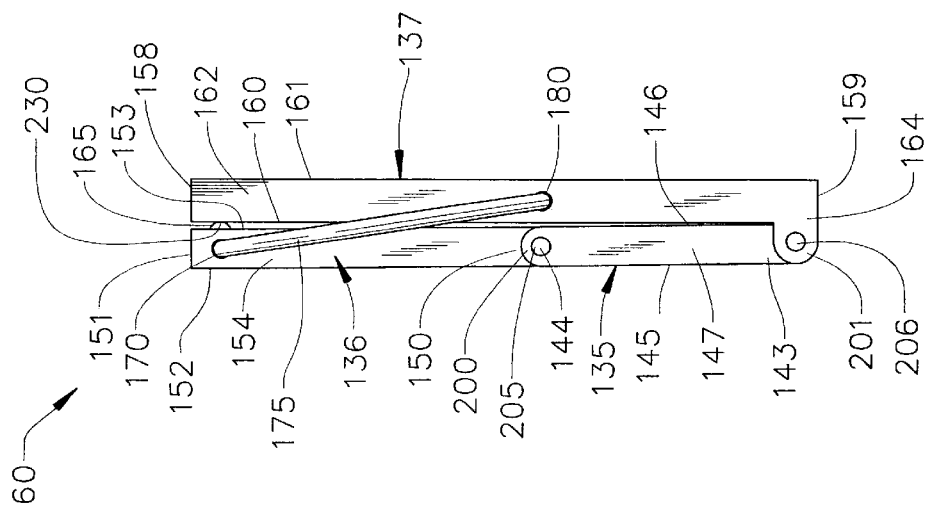
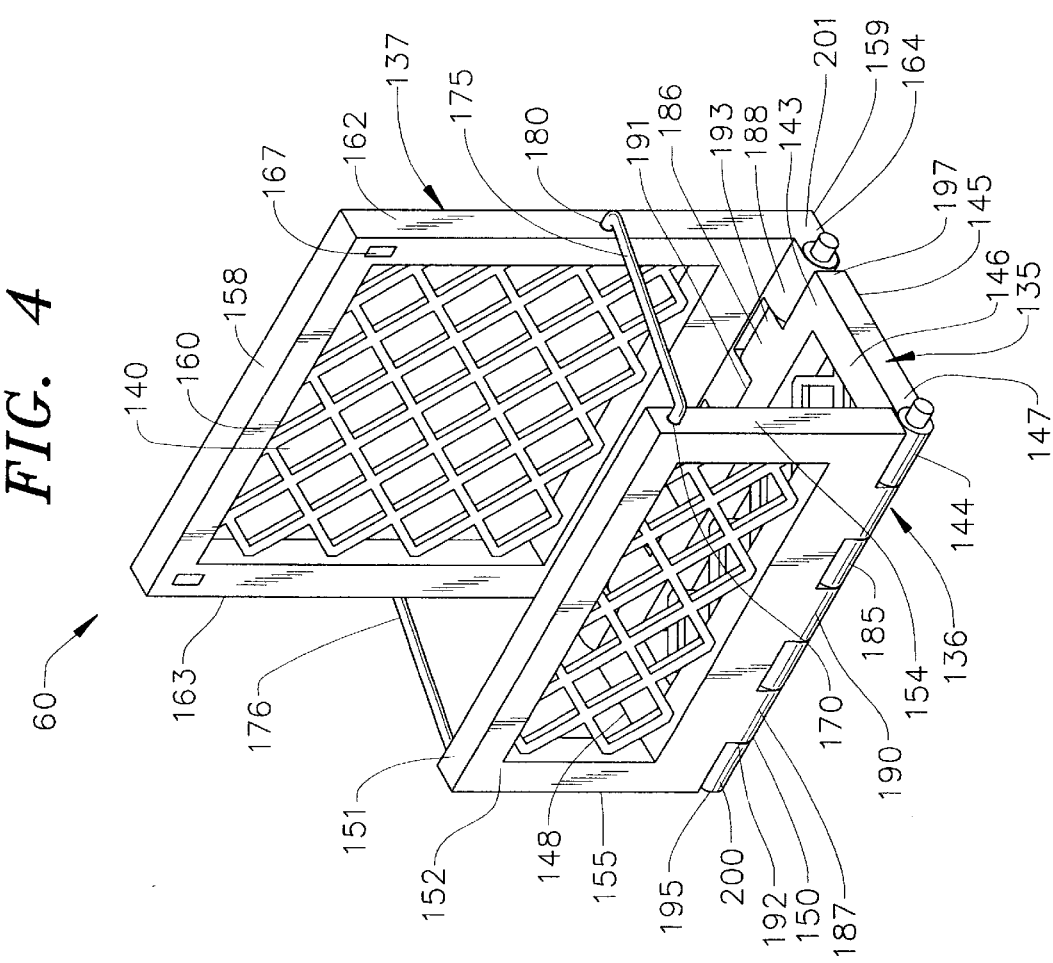

FOLDING STORAGE ASSEMBLY

BACKGROUND OF THE INVENTION

1. Field of the Invention

The present invention pertains to a folding storage assembly for protecting fragile items in shopping carts, such as those found in a store.

2. Discussion of the Prior Art

Shopping carts are widely known in the art and generally include a frame, a basket, wheels, and a handle for pushing the cart. The average shopper is buying more fresh produce than in years past, yet grocery carts remain the same with one large storage compartment. The large storage compartment typically has a limited size child seat, used in most cases to transport a child or a shopper's personal belongings. Shoppers without children often place fragile items, such as produce, in the child seat in order to protect them from heavier items. However, because of the limited size of the child seat, the majority of the produce is placed inside the shopping cart, thereby causing the shopper to risk damage or to constantly relocate the produce to prevent damage as heavier items are placed in the grocery cart. Further, most grocery stores are designed so the shopper begins shopping in the produce department. While the layout of grocery stores may make the store more appealing by stimulating the senses of shoppers, the layout also increases the risk of produce being crushed by heavier items placed in the cart as the shopper moves through the remaining aisles of the supermarket. To compound the problem, many stores have invested in large numbers of shopping carts and are reluctant to replace their entire fleet of carts to meet this new need because of the large cost involved.

Various attempts have been made to provide shoppers with an alternative storage space in a shopping cart. For example, U.S. Pat. No. 5,002,292 discloses an enclosure for storing items in a shopping cart positioned along the front wall of the shopping cart's basket. The enclosure includes at least two elongated panels positioned for mutual contact between the side walls of the basket. In addition, at least one of the panels is hinged to allow pivotal movement of the panel, thereby providing access to the enclosure. While the enclosure of the '292 patent provides an alternative area for storing items during shopping, the enclosure is not capable of folding to a stowed position. The inability to fold the enclosure to a stowed position is a disadvantage because there are times when a shopper wishes to utilize all of the cart space without being restricted by permanent fixtures in the cart.

In addition, various attempts have been made to provide a folding storage arrangement in a shopping cart. For example, U.S. Pat. Nos. 2,662,661 and 2,689,133 disclose a pivoting partition for use in a shopping cart. More specifically, the partition, which is pivotally attached to the floor of the shopping cart and is capable of moving between an upright and an inclined position, forms a storage area in the front of the shopping cart. The partition can also be moved along a guideway in order to increase or decrease the size of the storage area. However, even when the partition is in its upright position and the storage area is at its smallest, a division of the cart space exists. In addition, the partition and the cart basket are manufactured as one unit, therefore the folding storage arrangement is not adapted to fit into preexisting shopping carts.

Based on the above there still exists a need in the art for a folding storage assembly for storing fragile items in a shopping cart which can easily be folded into a stowed position when not in use. In addition, there exists a need for a folding storage assembly that can be manufactured inexpensively and be able to retrofit existing shopping carts.

SUMMARY OF THE INVENTION

The present invention is preferably directed to a folding storage assembly for holding items inside a shopping basket. When in a deployed or in-use position, the assembly provides a storage area for holding fragile items. The assembly is easily stowed in an upright position to accommodate larger items when the assembly is not in use.

According to a preferred embodiment of the invention, the folding storage assembly includes a first panel having first and second end portions, a second panel having first and second end portions, and a third panel having first and second end portions. The first panel is pivotally connected to the second panel. In addition, the third panel is pivotally connected to the first panel. The folding storage assembly is movable between an in-use position and a stowed position. In the in-use position, the first panel extends laterally from the second end portion of the third panel and the second panel projects upward from the second end portion of the first panel. In the stowed position, the first and second panels are positioned substantially flush with the third panel.

In accordance with a preferred embodiment of the invention, the folding storage assembly is adapted to be held in the in-use position or in the stowed position. The assembly may include a detent mechanism for holding the first and second panels substantially flush with the third panel. The detent mechanism holds the assembly in a stowed position, thereby allowing a shopper to use the entire cart basket. In addition, the assembly may include at least one connection member having a first end pivotally attached to the second end portion of the second panel and a second end attached to the third panel for pivotal movement relative to the third panel. The connection member prevents the second panel from folding when the assembly is in the in-use position. Moreover, the storage assembly may include at least one fastening member for fastening the assembly to the front wall of a basket. Therefore, the invention provides a folding storage assembly that can easily be fastened to an existing cart basket and can be secured in the in-use position or the stowed position to accommodate the needs of a shopper.

Additional objects, features and advantages of the invention will become more readily apparent from the following detailed description of preferred embodiments thereof. When taken in conjunction with the drawings wherein like reference numerals refer to corresponding parts in several views.

BRIEF DESCRIPTION OF THE DRAWINGS

FIG. 4 is an expanded view of the folding storage assembly of FIG. 1.

FIG. 5 is an enlarged side view of the folding storage assembly of FIG. 1 in a stowed position.

DETAILED DESCRIPTION OF THE PREFERRED EMBODIMENTS

Figure 1:
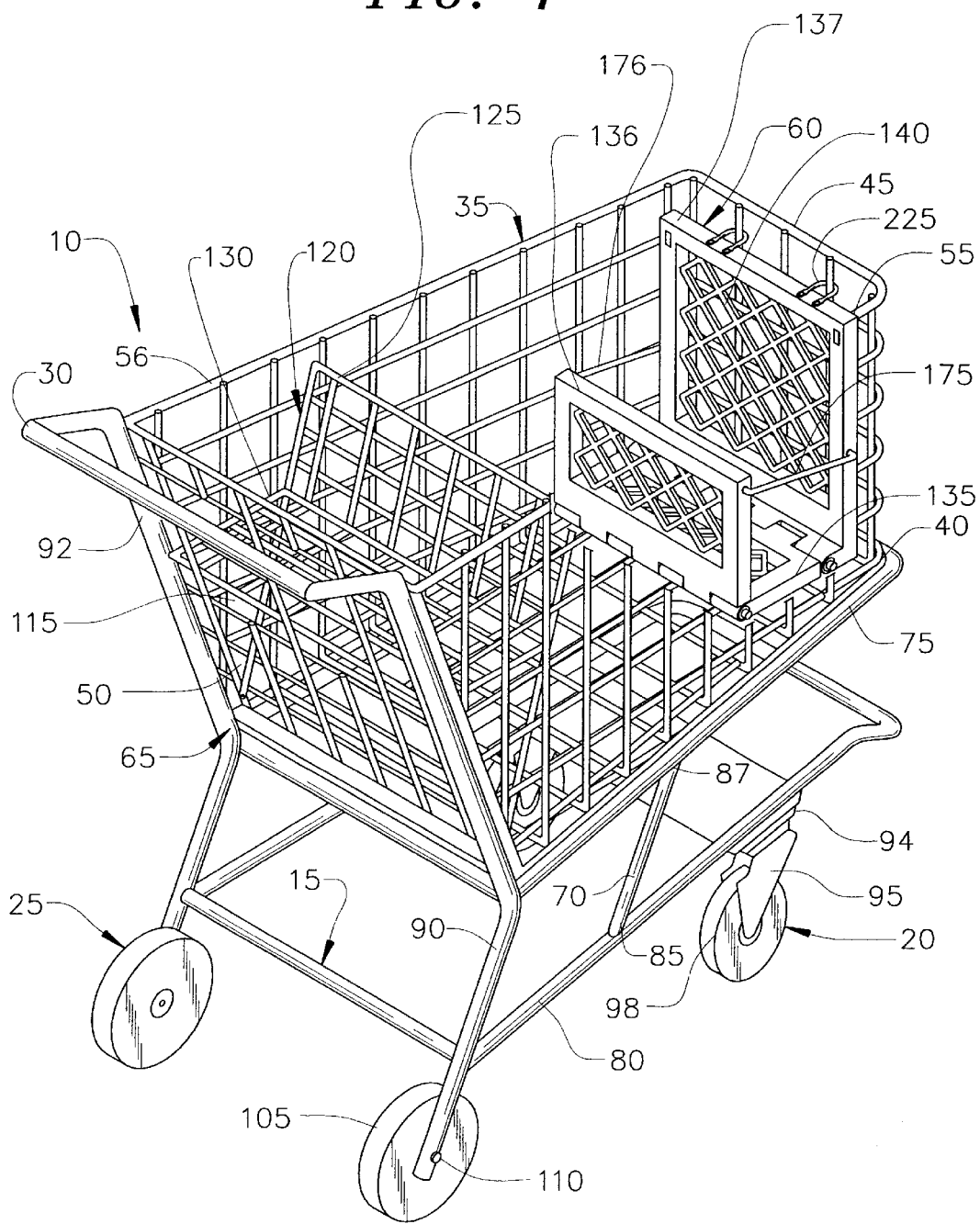
FIG. 1 is a perspective view of the folding storage assembly, according to a preferred embodiment of the present invention, mounted inside a cart basket.

With initial reference to FIG. 1, a shopping cart is generally indicated at 10. As shown, the cart 10 includes a frame 15, a pair of front wheel assembly 20 and a pair of rear wheel assemblies 25 supporting the frame 15, a handle 30 attached to the frame 15, and a basket 35, for holding items (not shown), attached to the frame 15. The basket 35 includes a floor 40, and spaced apart front 45, rear 50 and opposing side walls 55 and 56, which are interconnected and extend upward from the floor 40. In addition, the cart 10 includes a folding storage assembly 60, in accordance with a preferred embodiment of the invention, mounted in the basket 35 for holding items.

The frame 15 of the cart 10 includes the handle 30, a pair of upstanding tubular support members 65, a pair of intermediate tubular support members 70, a four-sided bottom tubular support member 75, and a Ushaped base portion 80. More specifically, the frame 15 is formed of the Ushaped base portion 80, which is attached to a first end 85 of each member of the pair of intermediate tubular support members 70. In addition, the Ushaped base portion 80 is attached to each member of the pair of upstanding tubular support members 65. A second end 87 of each member of the pair of intermediate support members 70 is attached to the four-sided bottom tubular support member 75, which is substantially parallel to the Ushaped base portion 80. Each member of the pair of intermediate tubular support members 70 forms an acute angle with the Ushaped base portion 80. The pair of upstanding tubular support members 65 are each formed of a unified tubular member bent into portions including a first portion 90 and an intermediate portion 92. The first portion 90 of each member of the pair of upstanding tubular support members 65 is attached to one of the rear wheel assemblies 25 at one end, then each first portion 90 extends at an angle towards the front wall 45 of the cart basket until reaching the four-sided bottom tubular support 75. Each of the upstanding tubular support members 65 then bends away from the front wall 45 of the cart at an obtuse angle forming an intermediate portion 92. Finally, each member of the pair of upstanding tubular support members 65 bends in the opposite direction, thereby forming the handle portion 30.

As is generally known in the art, the frame 15 is supported by a plurality of wheel assemblies. In general, the cart includes a pair of front wheel assemblies 20 and a pair of rear wheel assemblies 25. Each wheel of the pair of front wheel assemblies 20 includes a castor 94, a U-shaped bracket 95, and a wheel 98. As is known in the art, each bracket 95 for a respective castor 94 is adapted to pivot about a generally vertical axis, thereby allowing the castor 94 to swivel. In addition, each bracket 95 includes a shaft (not shown) which extends horizontally through the bracket 95 defining an axis about which the wheel 98 rotates. Each wheel in the pair of rear wheel assemblies 25 includes a rear wheel 105, a first portion 90 of the upstanding tubular support 65, and a shaft 110. The shaft 110 extends horizontally through the rear wheel 105 and the upstanding tubular support 65, thereby providing a connection between the wheel 105 and the support 65 and providing an axis about which the wheel 105 can rotate.

The cart 10, as mentioned above, includes basket 35. The basket 35 can be formed of metal, plastic, or a metal/plastic combination. The entire basket 35 is formed as an open latticework structure or intersecting bar structure. The basket 35 is adapted to be supported by the frame 15 and directly engages upstanding tubular support 65 and the bottom tubular support 75.

In addition, the rear wall 50 of the cart basket 35 includes a pair of leg holes 115 associated with a retractable child seat assembly 120. As known in the art, the retractable child seat assembly 120 is generally formed from a back portion 125 and a seat portion 130. The back portion 125 is generally formed of metal and is pivotally connected to the basket floor 40 where the floor 40 meets the rear wall 50. The seat portion 130 is pivotally connected to the back portion 125 and the rear wall 50 of the basket 35. The pivotal connection allows the seat assembly 120 to be stowed when not in use. The seat assembly 120 is preferably formed of metal or a combination of metal and plastic. In operation, the back portion 125 of the seat assembly 120 can be pushed away from the rear wall 50 of the cart basket 35, thereby placing the seat assembly 120 in an open position. When in the open position, the seat assembly 120 can hold a child or a shoppers personal items (not shown). When not in use, the back portion 125 of the seat assembly 120 can be pulled towards the rear wall 50 of the cart basket 35, thereby placing the seat assembly 120 in a stowed position. By placing the seat assembly 120 in a stowed position, a shopper can free up additional space in the cart basket 35. Since the structure and function of the retractable child seat assembly 120 is widely known in the art, the assembly will not be further discussed.

Figure 3:
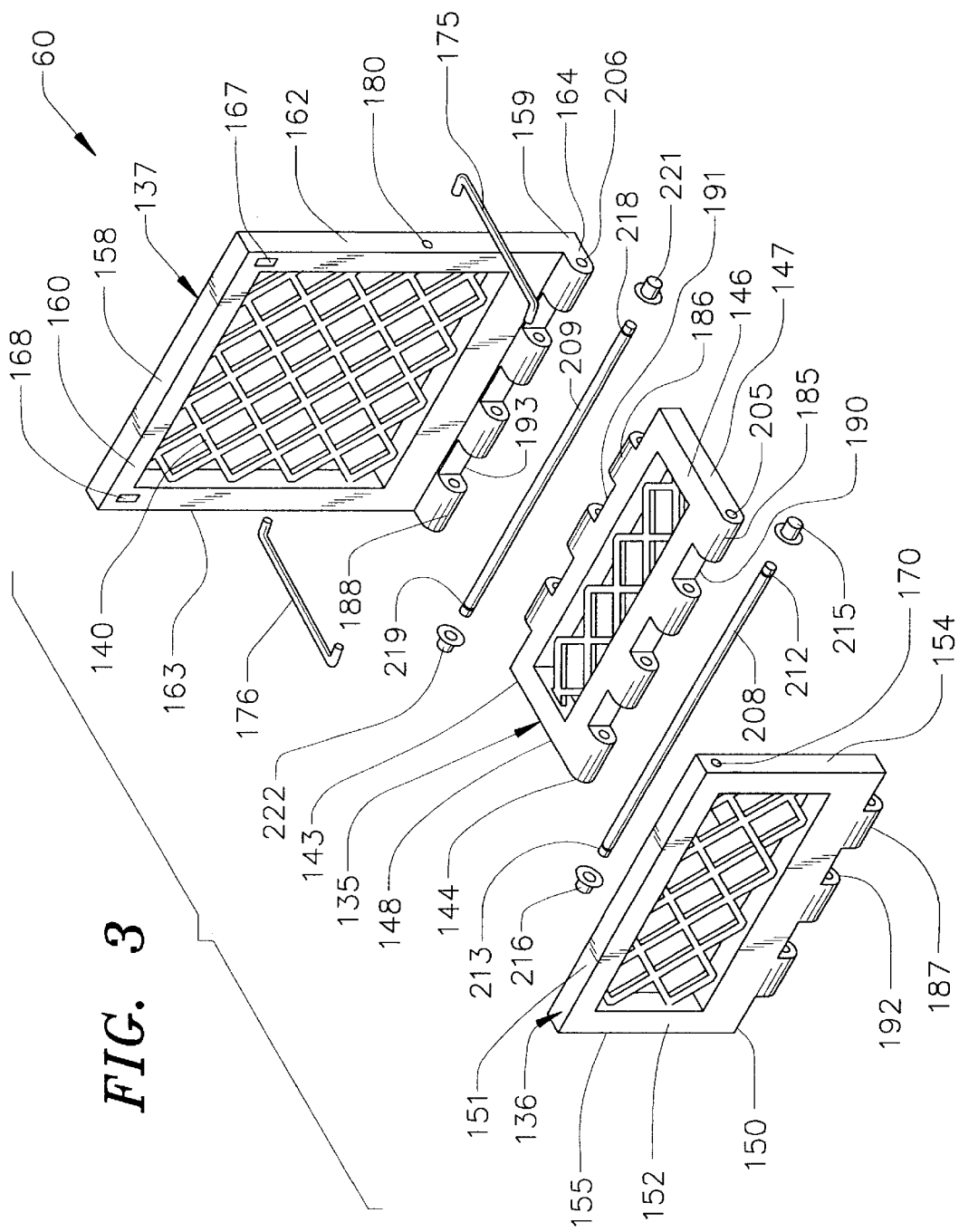
FIG. 3 is an enlarged perspective view of the folding storage assembly of FIG. 1 in an in-use position.

Referring now to FIGS. 3–5, the cart basket 35 further includes a folding storage assembly 60 positioned adjacent to the front wall 45 of the cart basket 35. The folding storage assembly 60 comprises a first panel 135, a second panel 136, and a third panel 137. Each panel is preferably formed of an open latticework structure 140 defined by multiple intersecting web portions. In addition, each panel preferably has a frame 145 surrounding the latticework structure 140. However, other materials and configurations may be used to form the panels. The first panel 135 has a first end 143, a second end 144, a first surface 145, a second surface 146, and two sides 147 and 148.

The second panel 136 has a first end 150, a second end 151, a first surface 152, a second surface 153, and two sides 154 and 155. Similarly, the third panel 137 includes a first end 158, a second end 159, a first surface 160, a second surface 161, and two sides 162 and 163. In addition, the second end of the third panel includes a foot 164 which extends perpendicularly to the first surface 160.

The first panel 135 and the second panel 136 are preferably each in the shape of a rectangle. The width of each panel is identical to the width of the other panels. However, the length of the third panel 137 is equal to the combined length of the sides 147 and 154 of the first 135 and second 136 panels respectively, as shown in FIG. 5.

Further, the second panel 136 includes a pair of projections 165 for insertion into a pair of apertures 167. The projections 165 are located along the second surface 153 of the second panel 136, near the second end portion 151. In addition, the second panel 136 includes a pair of opposed openings 170 for receiving connection members 175 and 176. One opening of the pair of openings 170 is located along each of the sides 154 and 155 of the second panel 136. The third panel 137 includes the pair of apertures 167 for receiving the pair of projections 165, wherein the pair of apertures 167 is positioned along the first surface 160 of the third panel 137, near the first end portion 158. The third panel 137 also includes a pair of openings 180 for receiving the connection members 175 and 176, wherein one opening of the pair of openings 180 is positioned on each of the sides 162 and 163 of the third panel 137, midway between the first 158 and second end portions 159.

Figure 2:
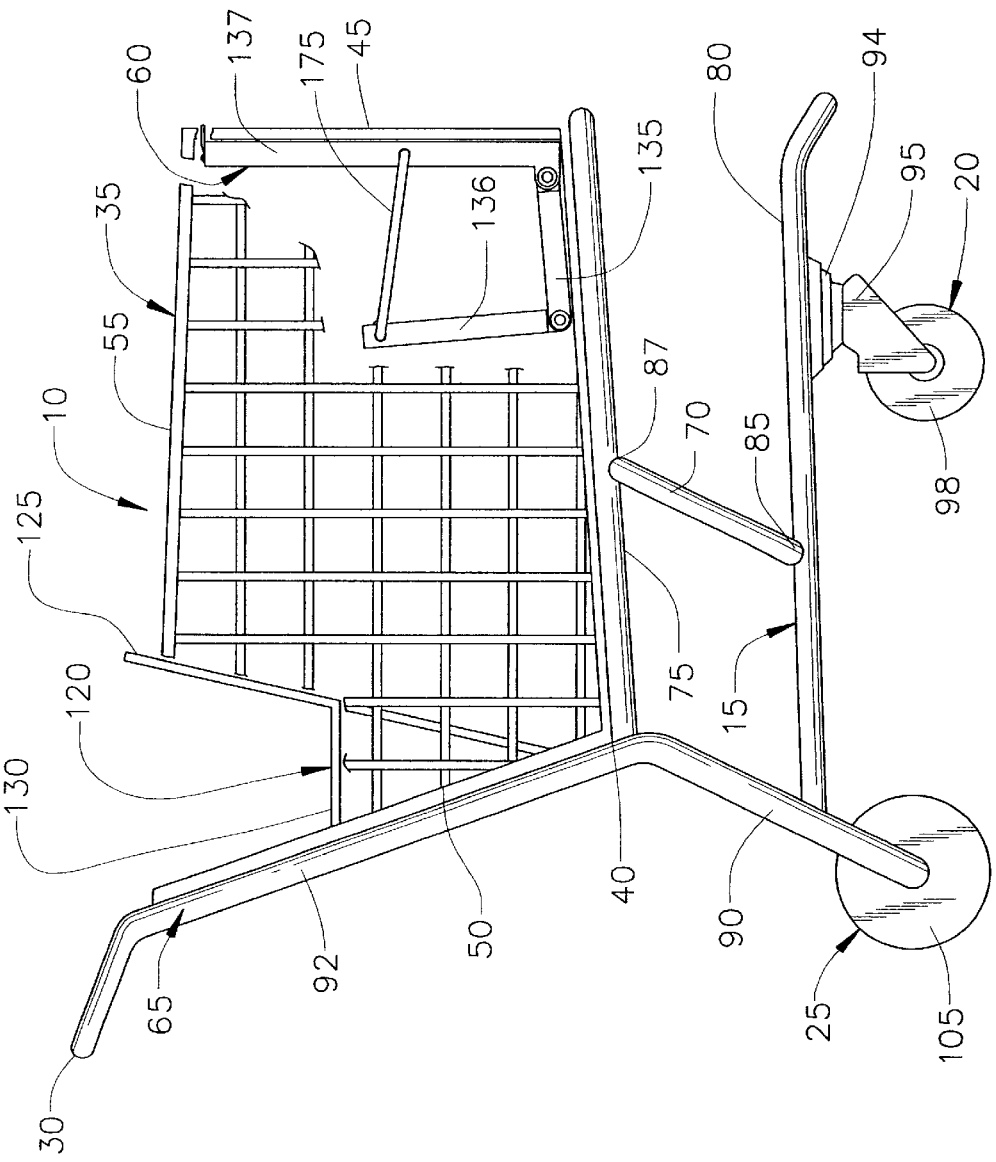
FIG. 2 is a side view of the folding storage assembly, according to a preferred embodiment of the present invention, mounted inside a cart basket.

As shown in FIG. 2, the panels of the folding storable assembly 60 are adapted to be interconnected. The first 143 and second end 144 portions of the first panel 135 each include a plurality of cylinders 185 and 186 alternating with a plurality of gaps 190 and 191. The first end 150 of the second panel 136 includes a plurality of cylinders 187 and a plurality of gaps 192. The plurality of cylinders 187 and is positioned to fit into a corresponding plurality of gaps 190 on the second end 144 of the first panel 135, thereby allowing an interlocking connection between the first 135 and second 136 panels, as further discussed below. Similarly, the horizontal foot 164 of the third panel 137 includes a plurality of cylinders 188 and a plurality of gaps 193 for joining with the plurality of cylinders 186 and gaps 191 on the first end 143 of the first panel 135, thereby allowing an interlocking connection between the first 135 and third 137 panels, as further discussed below.

When the panels (135, 136 and 137) are aligned, as shown generally in FIGS. 3–5, the pluralities of cylinders (185–188) form elongated cylinders 200 and 201 with apertures 205 and 206 therein. Elongated members 208 and 209 are inserted into apertures 205 and 206 to further secure the elongated cylinders 200 and 201. Elongated member 208 includes grooves 212 and 213 for receiving end caps 215 and 216. Similarly, elongated member 209 includes grooves 218 and 219 for receiving end caps 221 and 222. The end caps 215, 216, 221, and 222 are positioned to hold the elongated members 208 and 209 in the corresponding elongated cylinders 200 and 201. Specifically, one end cap is snapped into the groove at each end of each elongated member.

When in an open position, as shown in FIGS. 1, 2 and 4, the folding storage assembly 60 forms a J-shape. The first panel 135 lies parallel with the basket floor 40 and the first surface 145 of the first panel 135 is in continuous contact with the basket floor 40. The second panel 136 extends vertically from the second end 144 of the first panel 135. Similarly, the third panel 137 extends vertically from the first end 143 of the first panel 135. The third panel 137 generally lies flush with the front wall 45 of the cart basket 35. As shown in FIG. 1, a plurality of fastening members 225 may be used to secure the third panel 137 to the front wall 45. The plurality of fastening members 225 may be standard clips, snaps, or the like.

The open position of the folding storage assembly 60 is maintained with connection members 175 and 176, as best seen in FIG. 4. As previously discussed, the side ends 154 and 162 of the second 136 and third 137 panels include openings 170 and 180 for receiving connection member 175. Similarly, the side ends 155 and 163 of the second 136 and third 137 panels include openings (not shown) for receiving connection member 176. Connection members 175 and 176 are preferably rod shaped and are pivotally connected to the second 136 and third 137 panels, thereby allowing movement of the first 135 and second 136 panels relative to the third panel 137.

As shown in FIG. 5, the folding storage assembly 60 is capable of folding to a stowed position. When moving from an open position to a stowed position, the first panel 135 pivots relative to the third panel 137 and the second panel 136 is guided by the connection members 175 and 176. More specifically, the second surface 146 of the first panel 135 pivots towards the first surface 160 of the third panel 137 until the surfaces are in contact with each other. As the first panel 135 pivots, the second panel 136 is guided along an arc by the connection members 175 and 176 until the second panel 136 is stacked above the first panel 135 and the second surface 153 of the second panel 136 is in contact with the first surface 160 of the third panel 137.

As shown in FIG. 5, the folding storage assembly 60 is held in a stowed position by a detent mechanism 230. As previously described, the second panel 136 includes the pair of projections 165 for insertion into the pair of apertures 167 on the third panel 137. When in the stowed position, the pair of projections 165 on the second panel 136 are received into the pair of apertures 167 on the third panel 137, thereby securing the folding storage assembly 60 in a stowed position.

The folding storage assembly 60 is manufactured to easily retrofit existing shopping carts. During assembly, the first panel 135 is connected to the second panel 136 by inserting the plurality of cylinders 187 on the first end 150 of the second panel 136 into the corresponding plurality of gaps 190 on the second end 144 of the first panel 135, thereby forming the elongated cylinder 200. Similarly, the third panel 137 is connected to the first panel 135 by inserting the plurality of cylinders 188 on the second end 159 of the third panel 137 into the corresponding plurality of gaps 191 on the first end 143 of the first panel 135, thereby forming the elongated cylinder 201. To secure the elongated cylinders 200 and 201, elongated members 208 and 209 are inserted into apertures 205 and 206 of the elongated cylinders 200 and 201, respectively. In addition, end caps 215, 216, 221 and 222 are positioned on elongated members 208 and 209 to hold the elongated members 208 and 209 within the elongated cylinders 200 and 201. The assembly 60 is then placed in the shopping cart basket 35. The second surface 161 of the third panel 137 of the folding storage assembly 60 is placed flush against the front wall 45 of the cart basket 35. Finally, the plurality of fastening members 225 are added to hold the third panel 137 of the folding storage assembly 60 secure along the front wall 45 of the cart basket 35.

In operation, the folding storage assembly 60 can be placed in an in-use position in order to hold fragile items, such as produce. The second panel 136 of the assembly 60 can be pulled down by a shopper, thereby causing the first 135 and second 136 panel to be pivoted into an open position. The shopper may then use the storage assembly 60 to hold fragile items and protect them from heavier items in the cart basket 35. When the shopper needs to make additional room in the cart basket 35 to hold large items, the folding storage assembly 60 can easily be place in a stowed position. When a shopper pulls up on the second panel 136 of the assembly 60, the first 135 and second 136 panels pivot to an upright position. The pair of projections 165 on the second panel 136 are received into the pair of apertures 167 on the third panel 137, thereby holding the assembly 60 in a stowed position.

Although described with reference to preferred embodiments, it should be readily understood that various changes and/or modifications could be made to the invention without departing from the spirit thereof. In any event, the invention is only intended to be limited by the scope of the following claims.

I claim:

1. In a cart for transporting items comprising a frame, wheels supporting said frame, a handle attached to said frame, a basket attached to said frame for holding items, said basket including a floor, and spaced front, rear and opposing side walls which are interconnected and extend upward from said floor, a folding storage assembly for holding items, said folding storage assembly comprising:

a first panel having first and second end portions, said first end portion being pivotally mounted in the basket adjacent an interconnection between the front wall and the floor; and a second panel having first and second end portions, the first end portion of said second panel being pivotally connected to the second end portion of the first panel;

said folding storage assembly being movable between an in-use position, wherein said first panel extends along the floor of the basket from adjacent the front wall and said second panel projects upward from the second end portion of the first panel, and a stowed position, wherein the first and second panels are positioned substantially flush with the front wall and said panel is located above said first panel.

2. The folding storage assembly of claim 1, further comprising: at least one connection member having a first end pivotally attached to the second end portion of said second panel and a second end attached for pivotal movement relative to the front wall.

3. The folding storage assembly of claim 1, further comprising: a detent mechanism, said detent mechanism holding the first and second panels substantially flush with the front wall.

4. The folding storage assembly of claim 1, wherein the second end portion of said first panel and the first end portion of said second panel each include a plurality of cylinders capable of fitting together to provide a pivoting connection between the first and second panel.

5. The folding storage assembly of claim 4, further comprising an elongated member extending through the plurality of cylinders.

6. The folding storage assembly of claim 5, further comprising end caps for securing the elongated member.

7. A folding storage assembly adapted to be mounted in a basket, wherein said basket includes a floor, and spaced front, rear, and opposing side walls which are interconnected and extend upward from said floor, said storage assembly comprising:
   a first panel having first and second end portions, said first end portion adapted to be pivotally mounted in the basket adjacent an interconnection between the front wall and the floor; and
   a second panel having first and second end portions, the first end portion of said second panel being pivotally connected to the second end portion of the first panel;
   said folding storage assembly being movable between an in-use position, wherein said first panel extends along the floor of the basket from adjacent the front wall, and said second panel projects upward from the second end portion of the first panel, and a stowed position, wherein the first and second panels are positioned substantially flush with the front wall and said second panel is located above said first panel.

8. The folding storage assembly of claim 7, wherein the second end portion of said first panel and the first end portion of said second panel each include a plurality of cylinders capable of fitting together to provide a pivoting connection between the first and second panel.

9. The folding storage assembly of claim 8, further comprising an elongated member extending through the plurality of cylinders.

10. The folding storage assembly of claim 9, further comprising end caps for securing the elongated member.

11. The folding storage assembly of claim 7, further comprising at least one fastening member for fastening the storage assembly to the front wall of the basket.

12. In a cart for transporting items comprising a frame, wheels supporting said frame, a handle attached to said frame, a basket attached to said frame for holding items, said basket including a floor, and spaced front, rear and opposing side walls which are interconnected and extend upward from said floor, and a folding storage assembly mounted in said basket for holding items, said folding storage assembly comprising:
   a first panel having first and second end portions,
   a second panel having first and second end portions, the first end portion of said second panel being pivotally connected to the second end portion of the first panel,
   a third panel having first and second end portions, the second end portion of said third panel being pivotally connected to the first end portion of the first panel,
   said folding storage assembly being movable between an in-use position, wherein said first panel extends laterally to the second end portion of the third panel and the second panel projects upward from the second end portion of the first panel, and a stowed position, wherein the first and second panels are positioned substantially flush with the third panel and said second panel is located above said first panel.

13. The folding storage assembly of claim 12, further comprising: at least one connection member having a first end pivotally attached to the second end portion of said second panel and a second end attached to the third panel for pivotal movement relative to the third panel.

14. The folding storage assembly of claim 12, further comprising: a detent mechanism for holding the first and second panels substantially flush with the third panel.

15. The folding storage assembly of claim 12, wherein the second end portion of said first panel and the first end portion of said second panel each include a plurality of cylinders capable of fitting together to provide a first pivoting connection, and the first end portion of said first panel and the second end portion of said first panel each include a plurality of cylinders capable of fitting together to provide a second pivoting connection.

16. The folding storage assembly of claim 15, further comprising at least one elongated member, having first and second end portions, extending through at least one of said pivoting connections.

17. The folding storage assembly of claim 16, further comprising at least two end caps positioned over the first and second end portions of the at least one elongated member.

18. The folding storage assembly of claim 12, further comprising at least one fastening member for fastening the storage assembly to the front wall of the basket.

19. A folding storage assembly adapted to be mounted in a basket, said assembly comprising:
   a first panel having first and second end portions,
   a second panel having first and second end portions, the first end portion of said second panel being pivotally connected to the second end portion of the first panel,
   a third panel having first and second end portions, the second end portion of said third panel being pivotally connected to the first end portion of the first panel,
   said folding storage assembly being movable between an in-use position, wherein said first panel extends laterally to the second end portion of the third panel and the second panel projects upward from the second end portion of the first panel, and a stowed position, wherein the first and second panels are positioned substantially flush with the third panel and said second panel is located above said first panel.

20. The folding storage assembly of claim 19, further comprising: at least one connection member having a first end pivotally attached to the second end portion of said second panel and a second end attached to the third panel for pivotal movement relative to the third panel.

21. The folding storage assembly of claim 19, further comprising: a detent mechanism for holding the first and second panels substantially flush with the third panel.

22. The folding storage assembly of claim 19, wherein the second end portion of said first panel and the first end portion of said second panel each include a plurality of cylinders capable of fitting together to provide a first pivoting connection and the first end portion of said first panel and the second end portion of said first panel each include a plurality of cylinders capable of fitting together to provide a second pivoting connection.

23. The folding storage assembly of claim 22, further comprising at least one elongated member, having first and second end portions, extending through at least one of said pivoting connections.

24. The folding storage assembly of claim 23, further comprising at least two end caps positioned over the first and second end portions of the at least one elongated member.

* * * * *